Patented July 4, 1933

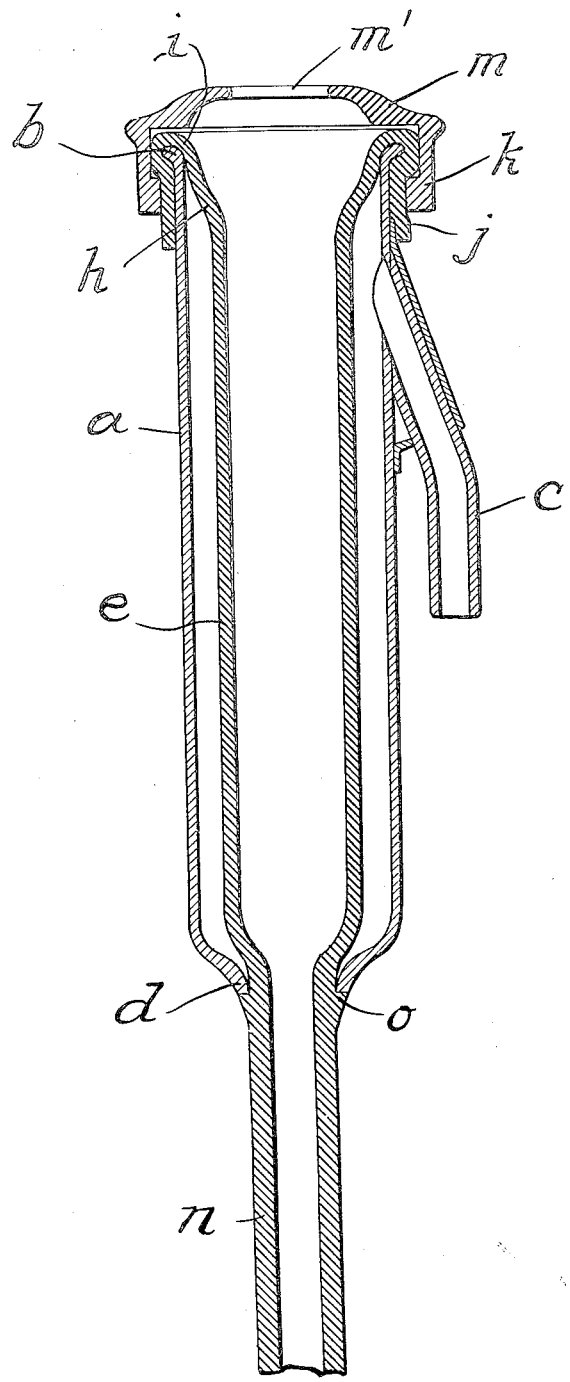

1,916,839

UNITED STATES PATENT OFFICE

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY

MILKING MACHINE TEAT CUP

Application filed February 14, 1931. Serial No. 515,686.

My invention relates to that type of teat cup for milking machines which comprises an outer rigid shell provided with a nozzle for connection with a conduit in which pneumatic pulsations are produced, and an inner flexible and elastic liner for connection with a tube adapted to be placed under a partial vacuum, through which liner and milk tube the milk from the cow is conveyed, the liner enclosing the milk chamber and spaced from the shell to afford an annular pneumatic pulsation chamber.

The object of the invention is to provide a teat cup one size of which will work on all sizes of teats and which may be easily disassembled, cleaned and reassembled.

Through long experience I have learned that, in order to accomplish the first of the above objects, the body of the liner must be of a definite size, there must be an abrupt increase in size near the top, and the liner must be kept stretched longitudinally. In order that they may be easily cleaned, the liner and the milk tube should be made in one piece and the inside should be smooth. As rubber liners gradually elongate in use, there must be provision to take up elongation and maintain the desired degree of tension.

The teat cup shown in vertical section in the accompanying drawing meets these requirements and represents a preferred embodiment of the invention.

$a$ is a rigid shell having an outturned flange $b$ around its top, a pulsation nipple $c$ attached to one side and a reduced diameter outlet $d$ at the bottom. Inside this shell is a liner, usually made of soft rubber, having a body portion $e$ of preferably uniform diameter and a top $i$ abruptly enlarged at $h$ to form a portion of relatively large diameter. The free end portion of the top $i$ is pulled outward and downward around the flange $b$, as at $j$, where it is held by the lower portion $k$ of a mouthpiece $m$ having an opening $m'$ to receive the teat.

Attached to, and preferably integral with, the lower end of the liner is a milk tube $n$, of a diameter preferably smaller than that of the liner, having outside it, near its junction with the liner, a shoulder, preferably a continuous ring $o$ whose external diameter is greater than the internal diameter of the outlet neck $d$ of the shell $a$.

It may be readily seen that the mouthpiece $m$ can be easily removed and that the interior of the cup is then smooth and readily cleaned. In assembling the cup the liner is inserted from the top and its enlarged upper end $i$ is pulled outward and downward around the flange $b$ and secured by the mouthpiece $m$. The milk tube $n$ is then pulled down until the ring $o$ passes beyond the reduced neck $d$. The pull on the milk tube $n$ is then relaxed and the ring $o$ then engages the lower edge of the reduced neck $d$.

If the body $e$ of the liner becomes elongated in use, a greater length of the enlarged upper end of the liner can be pulled over the flange $b$, so that when the ring $o$ is again pulled through the outlet $d$, the body $e$ of the liner will be stretched to a correct tension.

When it is desired to disassemble the cup, a twist of the milk tube $n$ will cause it and the ring $o$ to reduce in size so that the ring can pass up through the outlet $d$. The downturned portion of the top of the liner is turned up and the liner removed from the shell.

Having now fully described my invention, what I claim and desire to protect by Letters Patent is:

A teat cup for milking machines comprising a rigid tubular shell with a large opening at one end and a smaller opening at the other end, a flexible liner having a body portion, an abruptly enlarged portion at one end of the body portion of sufficient length to allow the folding back over the end of the shell a varying distance, a milk tube of reduced diameter connected to the other end of the body of the liner, a shoulder on the milk tube end of greater diameter than the smaller opening in the shell, the milk tube and shoulder being arranged to be inserted into the shell through the larger opening with the milk tube extending through the smaller opening, after which the enlarged portion of the liner is folded over the edge of the larger end of the shell and drawn down over the outside to leave the proper amount of the body between the larger end of the shell and the shoulder on the milk tube to properly tension the liner when the shoulder is drawn through the smaller opening in the shell, and means for securing the liner to the shell in its adjusted position at the larger end thereof.

In testimony of which invention, I have hereunto set my hand, at Poughkeepsie, New York, on this eleventh day of February, 1931.

JOHN L. HULBERT.